(No Model.) 3 Sheets—Sheet 1.
J. C. SNEDEN.
CAR FENDER.
No. 535,741. Patented Mar. 12, 1895.
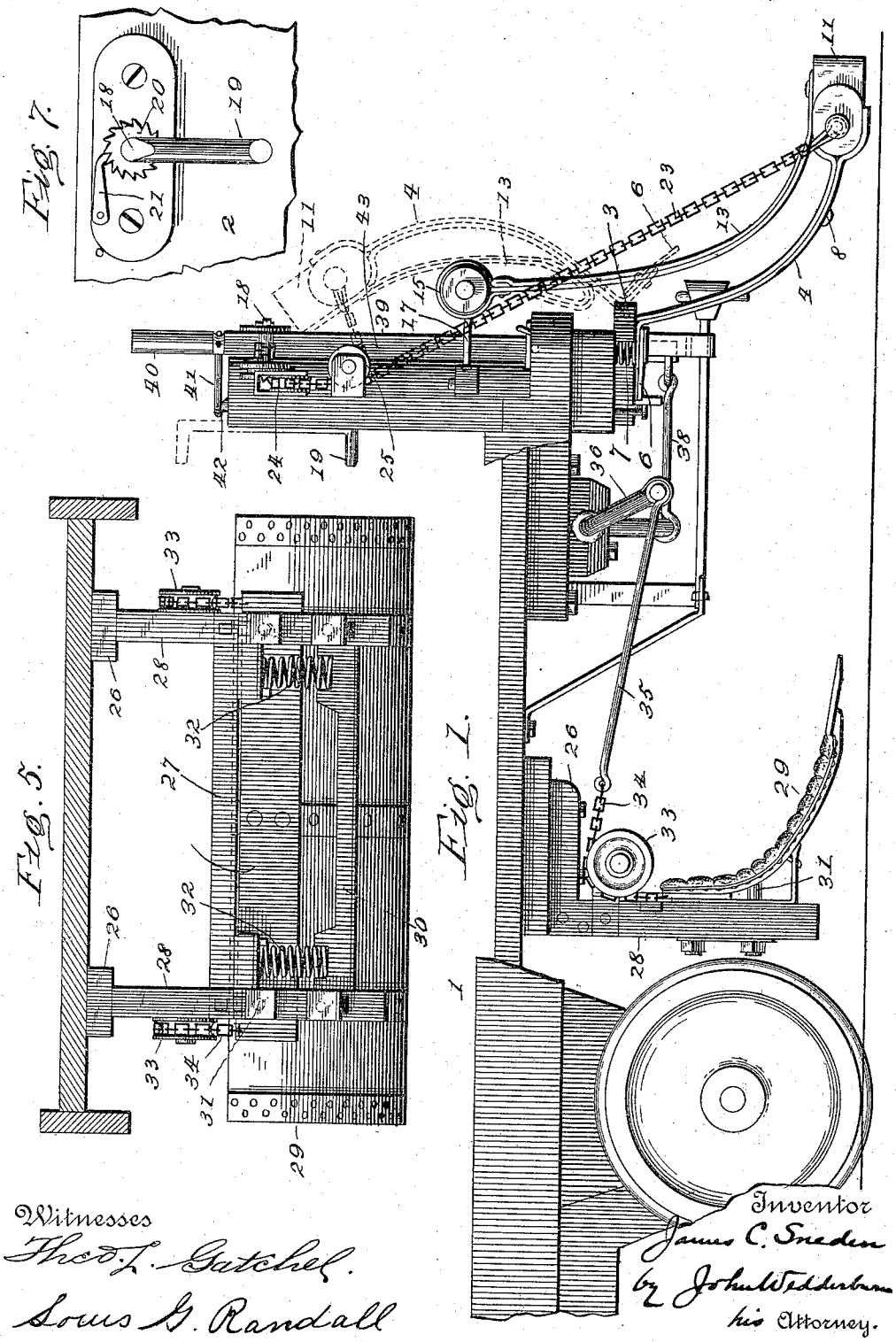
Witnesses
Theo. L. Gatchel.
Lours G. Randall
Inventor
James C. Sneden
by John Wedderburn
his Attorney.

(No Model.) 3 Sheets—Sheet 2.
J. C. SNEDEN.
CAR FENDER.
No. 535,741. Patented Mar. 12, 1895.
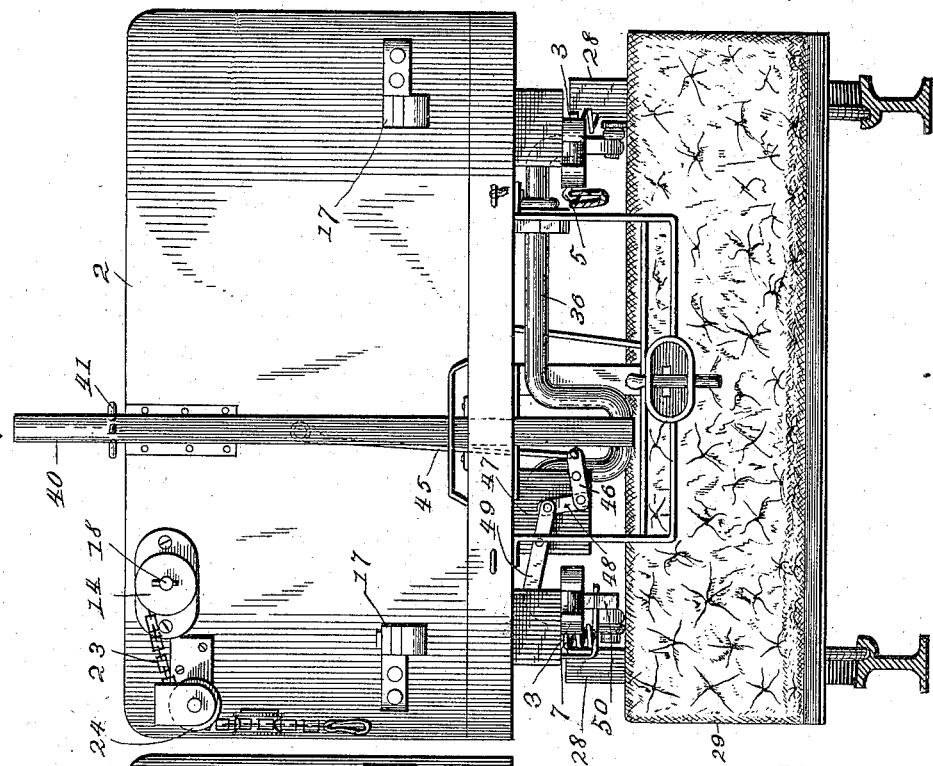
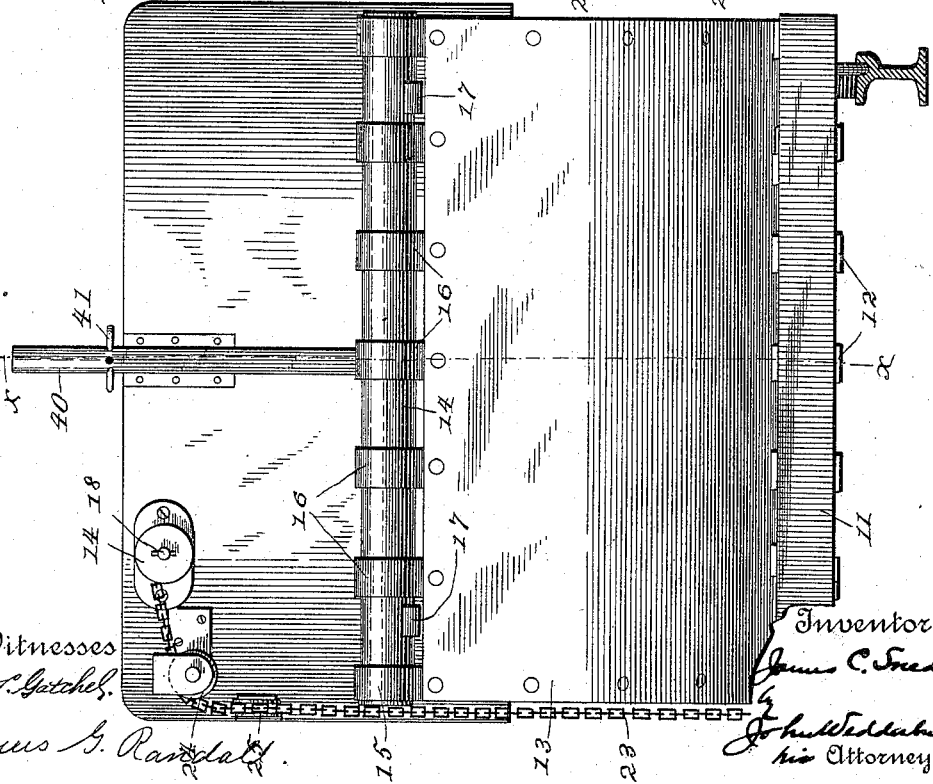
Witnesses
Inventor
his Attorney.

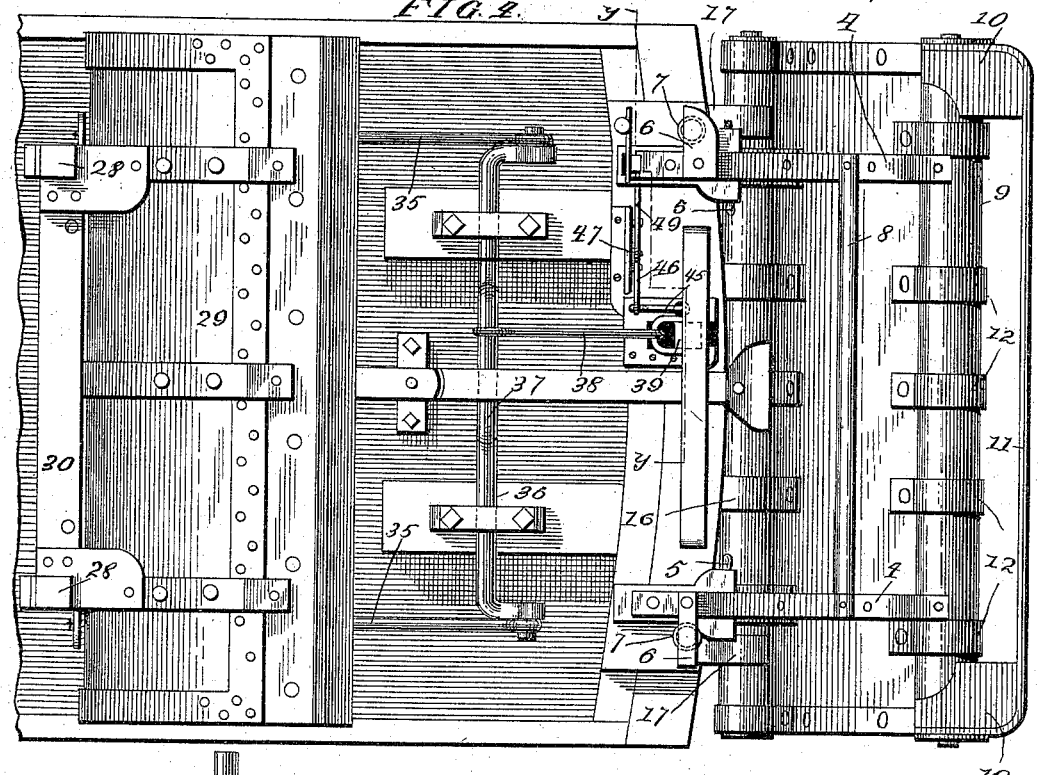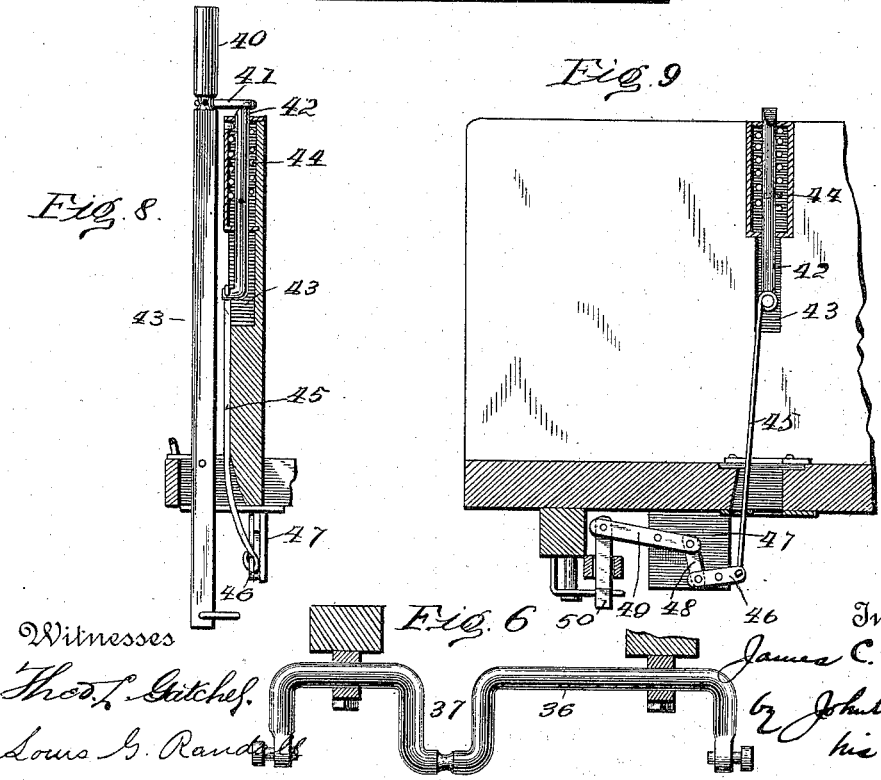

UNITED STATES PATENT OFFICE.

JAMES C. SNEDEN, OF PHILADELPHIA, PENNSYLVANIA.

CAR-FENDER.

SPECIFICATION forming part of Letters Patent No. 535,741, dated March 12, 1895.

Application filed January 12, 1895. Serial No. 534,668. (No model.)

*To all whom it may concern:*

Be it known that I, JAMES C. SNEDEN, a citizen of the United States, residing at Philadelphia, in the county of Philadelphia and State of Pennsylvania, have invented certain new and useful Improvements in Car-Fenders; and I do hereby declare the following to be a full, clear, and exact description of the invention, such as will enable others skilled in the art to which it appertains to make and use the same.

My invention relates to improvements in car fenders, the object of the same being to provide life saving devices adapted to be attached to cars of ordinary construction, whereby a person in the path of the car will be lifted from the ground and prevented from being run over by the wheels of the car.

The invention consists in providing a fender consisting of a pair of rubber rods having a strip of canvas connecting the same and held thereon by means of bands of rubber, the whole supported upon the lower side upon a frame work pivoted to the under side of the car and the upper rubber rods supported upon suitable brackets extending forwardly from the front of the dasher. I further provide means consisting of a chain connected to the lower rubber rod and to a suitable winding drum at the forward part of the dasher, for lifting the said fender when the same is not in use. In connection with this fender I use a supplemental fender located in the rear thereof just in front of the forward wheels of the car, so that if by any chance the front fender does not elevate the person or object struck out of the path of the wheels the rear fender will be released and thrown in contact with the ground so that it will serve the purpose of rescuing the person struck. The rear fender is normally out of engagement with the ground and is held in such position against the force of a pair of coiled springs by means of a chain, a pitman, a crank shaft and a rod pivoted to the front of the dasher which is held in place by means of a bolt which it is adapted to engage when in its set position. The said bolt is connected at its lower ends to a system of levers in turn connected with a trigger which is engaged by a rearward projection from the frame of the front fender. This trigger is actuated by the upward movement of the front fender, thereby permitting the rear fender to be forced to the ground through the action of the coiled springs acting in connection therewith.

The invention also consists in other details of construction and combinations of parts which will be hereinafter more fully described and claimed.

In the drawings forming a part of this specification: Figure 1 is a side elevation of my fender shown attached to a street car of ordinary construction. Fig. 2 is a front elevation of the same. Fig. 3 is a similar view with the front fender detached. Fig. 4 is a bottom plan view of the devices attached to a car of ordinary construction. Fig. 5 is a rear view of the back fender. Fig. 6 is a detail view of the crank shaft for transmitting power from the front fender to the rear fender, showing the same in its bearings on the under side of the car. Fig. 7 is a rear view of the car dasher partly broken away. Fig. 8 is a vertical longitudinal partial section on the line $x-x$ of Fig. 2. Fig. 9 is a vertical section on the line 7—7 of Fig. 4.

Like reference numerals indicate like parts in the various views.

Referring now to the drawings, 1 represents a car of ordinary construction, and 2 the dash board thereof. On the lower side of the car body just beneath the dash board are a pair of brackets 3 having bifurcated ends, between which are adapted to fit the ends of the side bars 4, 4, of the front fender frame. These side bars 4, 4, are perforated laterally as are also the bifurcated ends of the brackets 3, and have pins 5, 5, passing through the said perforations for the purpose of pivotally securing said side bars to the said brackets.

Extending rearwardly from the side bars 4 are projecting flanges 6, 6, which engage coiled springs 7, 7, projecting from the under side of the car body for the purpose of forming a resilient stop for the front fender when the same is in its downward position. The side bars 4, 4, are connected by a cross bar 8 for the purpose of strengthening and supporting the same. In the forward ends of said side bars is secured a rubber rod 9 passing entirely across the front of the car and extending at each end slightly beyond the side bars 4, 4. At each end of said rubber rod extends a hard rubber block 10 and connecting the same is a band of flexible rubber 11, against which the force of the jar caused by striking an object is diminished.

Surrounding the rubber rod 9 are a series of leather or metallic loops 12, 12, which are in turn connected to a sheet of canvas or other suitable material 13 which forms the supporting part of my front fender. Connected to the upper ends of the said canvas sheet is a second rubber bar 14. The sheet 13 and bar 14 are connected at their outer ends by leather or metallic loops 15 similar to those by which the lower end of the sheet 13 is connected to the bar 9. Between the outer loops 15 is a series of flexible rubber loops 16 connecting the sheet 13 and bar 14 for the purpose of forming a resilient connection between the two. The bar 14 when the front fender is in place, rests upon a pair of supports or brackets 17 secured to the forward part of the dasher 2, as clearly shown in Fig. 1.

Secured in suitable bearings in the dasher 2 and passing therethrough, is a shaft 18, having upon its inner side a crank arm 19, and carrying a ratchet 20 which is engaged by a pawl 21 on the inside of the dasher 2. The outer end of said shaft 18 is provided with a winding drum 22, and secured thereto is a chain 23 which passes over rollers 24, 25, suitably mounted on the front of the dasher 2 and is connected at its lower end to the outer end of the rubber rod 9. By this construction it will be seen that by turning the crank 19 the chain 23 will be wound up upon the drum 22 and the front fender drawn up against the front of the car, as clearly shown in dotted lines in Fig. 1. This is done when the cars are taken to the depot or when a fender is provided on each end of the car and it is desired to throw out of use the one on the rear end.

On the under side of the car, just in front of the forward wheels thereof, is a bracket 26 securely bolted to the car and having a transverse supporting bar 27 connecting the two side bars 28 of said bracket. To this bracket is secured my rear fender 29, which consists of a concaved frame having a soft front surface for relieving the force of a blow of a body against it, and having at its forward end a strip of soft rubber extending entirely across the car, for the purpose of readily picking up any object with which it may be brought into contact. On the rear side of said fender 29 is a cross bar 30 which is adapted to fit between the side bars 28 of the bracket 26. Said side bars 28 are slotted longitudinally and in these slots pass bolts 31 for holding the fender 29 in engagement therewith. Between the cross bar 27 of the bracket 26 and the cross bar 30 of the fender 29 are located a pair of strong coiled springs 32 which tend to force the said fender downward into engagement with the ground.

Mounted in the brackets 26 is a pair of pulleys or rollers 33 around which pass chains 34 connected at their rear ends to the upper end of the fender 29 and at the forward ends to links or connecting bars 35, which links are in turn connected to the outer ends of a double cranked shaft 36 mounted in suitable bearings on the under side of the car body. The crank portion 37 of said shaft 36 is connected through a link 38 to the lower end of a lever 39 fulcrumed in the forward part of the car. The said lever 39 extends upwardly along the front of the dasher 2 and terminates in a handle 40. Near the upper end of said lever the same is provided with a loop 41 which extends rearwardly and is adapted to pass over and be engaged by a latch bar or bolt 42 extending through a recess 43 in the dash board 2. By this means the said lever 39 is kept normally alongside the front of the dasher. The latch bolt 42 is kept normally in its upper position by means of a coiled spring 44 acting against the same and upon a shoulder in the recess 43 in which said latch moves.

Extending from the lower end of the latch bar 42 is a rod 45 which is in turn connected to the outer end of a lever 46 fulcrumed at its center in a bracket or plate 47 secured to the under side of the car body. The other end of said lever 46 is connected through a link 48 to one end of a second lever 49 fulcrumed at its center in the said plate or bracket 47, and connected at its other end to the upper end of a trigger 50 which is engaged by one of the rearwardly extending flanges 6 of the side bars 4 of my front fender. By this construction it will be seen that the upward movement of the front fender will cause a downward movement of the trigger 50 and through the levers 46, 49, and their connecting parts will cause a downward movement of the latch bolt 42, thereby releasing the lever 39 from engagement therewith and permitting the downward movement of the rear fender through the springs 32.

The invention has now been sufficiently described, it is thought, to enable its operation to be readily understood. Briefly stated, this is as follows: The normal position of the fenders is as shown in Fig. 1, that is, with the front fender swung down with its lower end running within two or three inches of the ground and the rear fender raised against the pressure of the springs 32 through the chains 34, links 35, crank shaft 36, link 38 and lever 39, the latter being held at its upper end through the loop 41 engaging the latch bolt 42. When an object is struck by the front fender the strip of flexible rubber along the front part thereof relieves the force of the blow, prevents injury and throws the person or object struck upon the canvas 13 where the same is held until the car is stopped and he or it can be removed from the dangerous position. If by any chance, as often happens in fenders of similar construction, the forward end thereof is thrown upward and the person or object struck passes beneath the same the flanges 6 will be forced down and will in turn draw down the trigger 50 and through the levers 46, 49 and their co-acting parts will release the latch bolt 42 from engagement with the lever 39 and permit the lower end of said lever to be drawn back by the pressure of the springs 32 and the rear fender 29 forced down into contact with the ground. In this way the person or object struck will be picked up by the rear fender and saved from accident by the wheels of the car.

It will be observed that my fenders may be attached to cars of ordinary construction by very simple mechanism, and the front fender may be readily removed and replaced by means of the pins 5 passing through the perforations in the side bars 4 and the brackets 3. When it is desired to take the cars into the depot, or for any reason to throw the front fender out of operation, the same may be readily done by winding up the chain 23 upon the drum 22.

The invention has been described in its preferred form, but it is obvious that many minor changes may be made therein without departing from the nature or spirit of the invention or sacrificing any of its advantages.

Having now described my invention, what I claim as new, and desire to secure by Letters Patent, is—

1. A car fender consisting of a frame, the side bars of which are adapted to be pivotally connected to brackets in the forward part of the car, rubber rods connecting the forward ends of said bars, having a rubber block at each end thereof, and a strip of flexible rubber connecting the same, a second rubber rod adapted to be supported upon brackets projecting from the forward part of the car, and a sheet of canvas or other suitable material between said rubber rods and flexible connections between said rods and said sheet substantially as described.

2. The combination with a car, of a fender pivoted to the forward part thereof, having rearwardly extending flanges from the side bars thereof, a supplemental fender located at the rear thereof mounted in suitable brackets secured to the under side of said car, springs for normally urging said rear fender downward, a latch bolt in the forward part of said car, a lever adapted to be engaged by said latch bolt, and connections between the lower end of said lever and said rear fender, whereby the latter is raised when said lever is in engagement with said latch bolt, and is lowered when said lever is thrown out of engagement with said latch bolt, a trigger and connections between said trigger and said latch bolt for releasing the same, the said trigger being in engagement with said rearwardly extending flanges and actuated thereby upon the upward movement of the forward fender, substantially as described.

3. The combination with a car, of a fender pivoted to the forward part thereof and having rearwardly extending flanges from the side bars of its frame, a supplemental fender located in the rear thereof and supported in a bracket secured to the lower side of the car, bolts extending from said fender and moving in elongated slots in the side bars of said brackets, coiled springs between said bracket and said fender for normally urging the latter downward, pulleys located in the upper sides of said bracket, chains connected to the upper ends of said supplemental fender, and through links to the outer ends of the crank shaft mounted in bearings on the under side of said car body, a lever pivoted to the forward part of said car and connected through a link to the crank portion of said crank shaft, a spring latch bolt in the upper end of the dash board of said car for holding said lever in close contact with said dash board, a rod connecting the lower end of said latch bolt with the outer end of a lever fulcrumed in a bracket on the lower side of said car, a second lever connected through a link to the outer end of the last mentioned lever, a trigger connected to the outer end of the last mentioned lever, the said trigger being in engagement with the said rearwardly extending flanges on the front fender, whereby upon raising the lower end of said forward fender the said trigger may be depressed, the latch bolt withdrawn, the lever in connection therewith released, and the supplemental fender lowered, substantially as and for the purpose described.

In testimony whereof I have signed this specification in the presence of two subscribing witnesses.

JAMES C. SNEDEN.

Witnesses:
WM. L. FORD,
WM. M. STOCKBRIDGE.